Oct. 25, 1927.                                                      1,646,386
R. BOWEN
MIXING DEVICE
Filed Feb. 24, 1925                              3 Sheets-Sheet 1

INVENTOR
Richard Bowen
BY
Mayer Warfield & Watson
ATTORNEY

Oct. 25, 1927.  
R. BOWEN  
MIXING DEVICE  
Filed Feb. 24, 1925

INVENTOR  
Richard Bowen  
BY  
Mayer Warfield & Watson  
ATTORNEY

Patented Oct. 25, 1927.

1,646,386

UNITED STATES PATENT OFFICE.

RICHARD BOWEN, OF COLUMBUS, OHIO, ASSIGNOR TO SUPER COAL PROCESS COMPANY, OF AUGUSTA, MAINE, A CORPORATION OF MAINE.

MIXING DEVICE.

Original application filed March 13, 1924, Serial No. 698,831. Divided and this application filed February 24, 1925. Serial No. 11,070.

This invention relates to mixing devices and particularly to devices adapted for mixing the materials to be supplied in apparatus designed for the fabrication of agglomerated masses.

The general object of this invention is to provide an improved, efficient and readily manufactured mixing device.

Specifically an object of this invention is to provide an improved mixing device adapted for intimately mixing the materials in masses to be agglomerated; this application being a division of my copending application Serial No. 698,831, filed March 13, 1924, which relates to apparatus for fabricating agglomerated masses.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which.

Figure 2:
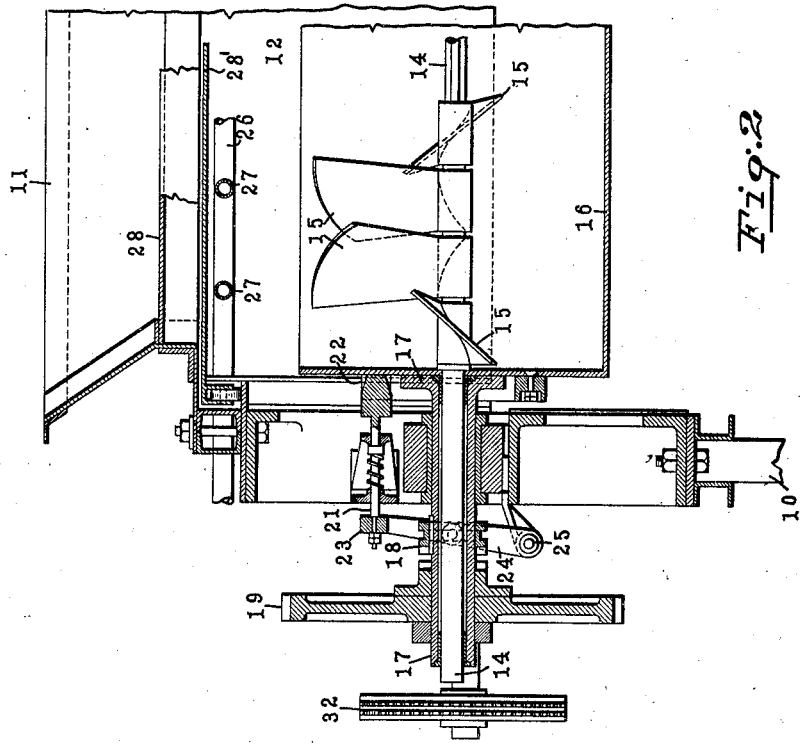
Fig. 2 is a fragmentary sectional view taken on the line 2—2 of Fig. 1.
Figure 1:
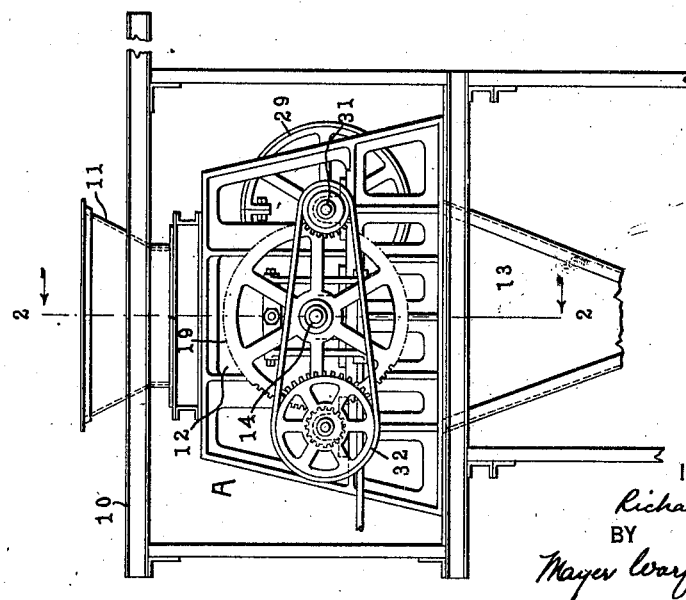
Figure 1 is a side elevation of a mixing device constructed in accordance with this invention.
Figure 3:
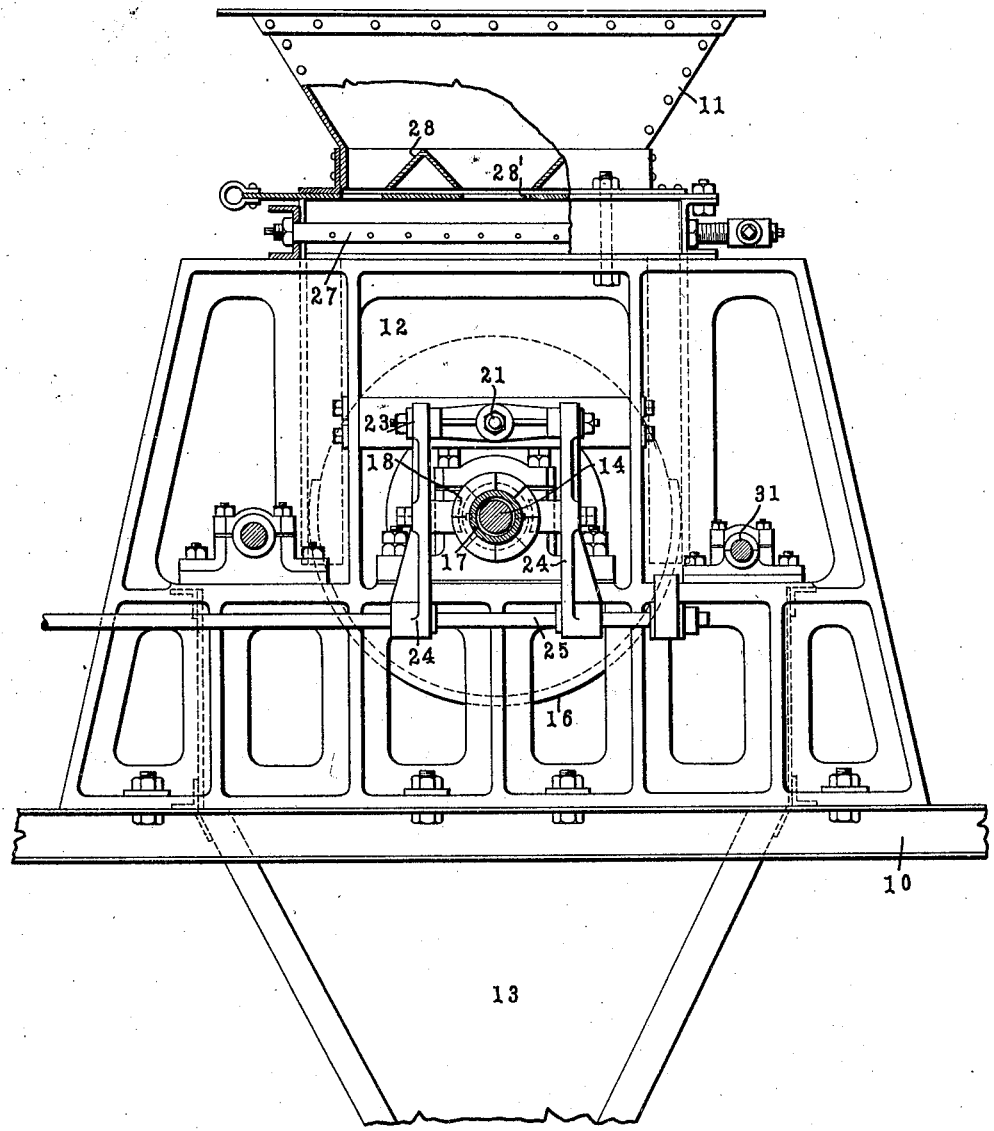
Fig. 3 is an enlarged end view of the mixing device proper, parts being broken away in order to better illustrate the parts.

Referring now to the drawing and to Fig. 1 in particular, A denotes generally the mixing device which is shown as supported in operative position with respect to co-operating apparatus by means of a suitable frame work, such as indicated at 10.

The mixing device, as illustrated, has an upper hopper 11, a mixing chamber 12 and a lower hopper 13 adapted to receive the mixture, when sufficiently mixed. Within the mixing chamber, as shown more clearly in Fig. 6, there is disposed a rotatable shaft 14, to which mixing blades 15 are secured. These blades are so disposed that the projections of their edges upon the axis of the shaft 14 meet it at an acute angle.

Arranged to pivot about the shaft 14 is a swinging trough-like member 16 forming a bottom for the mixing chamber and having a rigidly secured sleeve 17 which serves as a bearing for the shaft 14 and is actuated through a sliding collar 18, the latter being keyed to the sleeve 17, as indicated. The collar is adapted to be moved axially at will into and out of engagement with a constantly rotating gear 19, which normally rotates on the sleeve 17, as an idler. When the collar 18 is slid into engagement with gear 19, power is transmitted therefrom to the sleeve 17 to move the bottom 16 into an upper inverted position to discharge the mixed batch into the lower hopper 13.

A stop is provided for the bottom member 16 in order to insure that it will come to rest in proper registry when swung into lower position. This stop includes a latch bar or plunger 21, which is resiliently pressed into a groove 22 in the upper part of the end wall of the bottom member 16. This latch bar or plunger is connected at 23 with a lever 24, which is pivoted at 25 and arranged to actuate the sliding collar 18. Thus when it is desired to apply power to move the bottom 16, the plunger 21 is automatically removed from engagement with the groove 22, thereby releasing the bottom to be moved by the gear 19. When the bottom is swung back to the lower position, and as it approaches the desired point of rest, the collar 18 is disengaged from the gear 19, the momentum with which the bottom member is moving carrying it on to a position where the plunger 21 will snap into engagement with the groove 22, thereby holding it stationary and fixed in the desired lower position.

Within the mixing chamber 12 there is disposed a grid of pipe 26, provided with transverse sections 27 having perforations in their lower surfaces. These transverse sections are disposed near the top of the mixing chamber above the mixing blades 15 and are adapted to discharge downwardly a heating medium such as steam to heat and assist in the proper mixing of the ingredients. Just above the grid and at the base of the upper hopper 11 there are disposed a plurality of triangular transverse bars 28 which aid in attaining the proper distribution of the ingredients which are poured into the hopper within the mixing chamber. Just below the bars 28 is disposed the transversely movable valve 28', which is adapted to close the top of the mixing chamber when desired.

Figure 4:
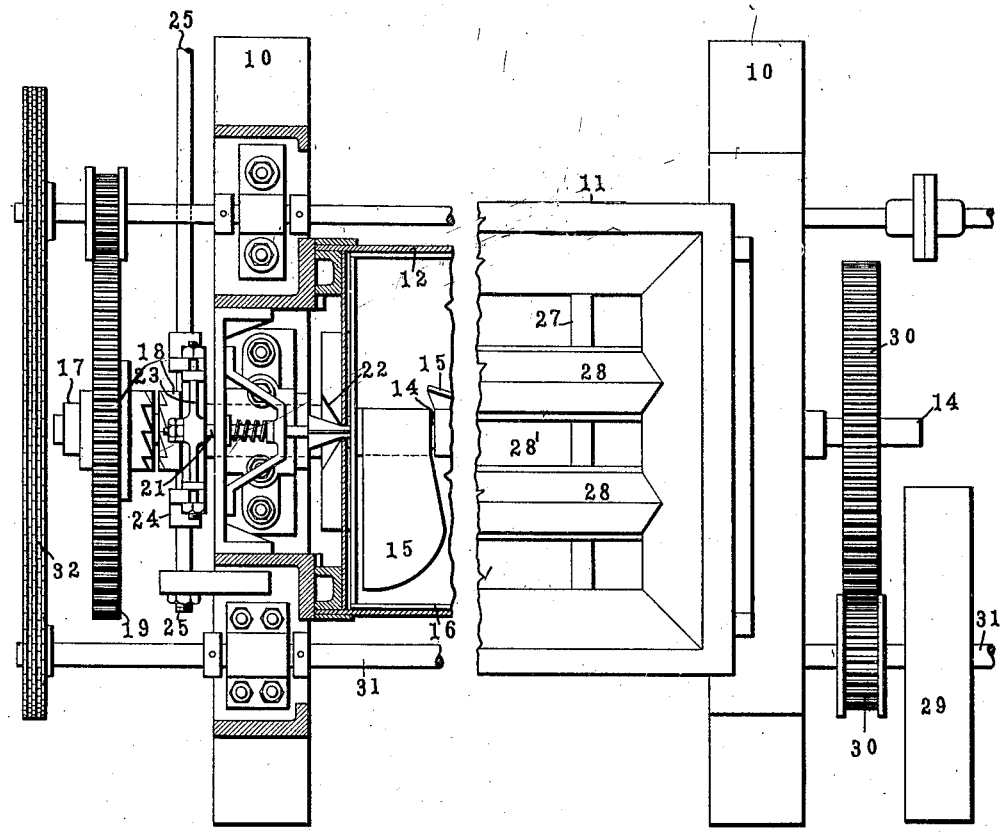
Fig. 4 is a view partly in section and partly in plan (parts being broken away) showing further details of the mixing device illustrated in Fig. 3 as viewed from the top.

The mixing device, as shown more clearly in Fig. 4 is actuated from the single pulley 29, which through suitable gearing 30 rotates the shaft 14. This pulley 29 has power shafting 31 which transmits power through gearing 32 to actuate the idler gear 19. The pulley 29 may be driven from any suitable power unit (not shown) by means of a belt.

In operating the mixing device above described the components to be mixed are first placed in the hopper at 11 and fed to the mixing chamber as desired. The components may be, for example, comminuted coal and coal tar pitch, which are to be taken in the amounts taught in my copending application Serial No. 684,682, filed Jan. 5, 1924, or, typically, in the ratio of ten parts of coal to one of the pitch. The components in the mixing chamber are mixed together and agitated by means of the revolving blades 15, the components being preferably heated during mixing by a suitable heating means. In the form of the invention here illustrated, this is accomplished by the grid of pipe shown at 27 from which live steam is injected into the mixture during mixing. The temperature of the steam thus used for heating while mixing the components above indicated is preferably from 250° to 350° F. By reason of the angular disposition of the blades, the components while being mixed are not only given a tangential thrust but also an axial thrust by the blades 15, and are partially elevated thereby as they go around. The materials are thus thoroughly agitated, the comminuted particles falling through paths generally crossing each other thereby becoming very intimately mixed.

When the components have been suitably mixed the lever 24 is moved to couple the continuously revolving idler gear 19 mechanically to move the bottom member 16 in order to discharge the mixture into the lower hopper 13, from whence the mixture is removed as desired.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. A mixing device adapted for continuous batch-mixing of heterogeneous components including viscous material, comprising an upper hopper, a lower hopper, a mixing chamber, each being arranged as a successive continuation of the former, the latter being provided with a bottom formed of a movable member arranged to be tiltably withdrawn so as to provide an unobstructed relatively large opening disposed centrally and adapted to discharge into the lower hopper, said hoppers each being provided with a valve controlled outlet, and revolving blades in said chamber arranged to impart both vertical and horizontal movement to the components within the chamber.

2. A mixing device adapted for continuous batch-mixing of heterogeneous components including viscous material, comprising an upper hopper, a lower hopper, a mixing chamber, each being arranged as a successive continuation of the former, the latter being provided with a bottom formed of a movable trough-like member arranged to be tiltably withdrawn so as to provide an unobstructed relatively large opening disposed centrally and adapted to discharge into the lower hopper, said hoppers each being provided with a valve controlled outlet, revolving blades in said chamber arranged to impart both vertical and horizontal movement to the components within the chamber, and a grid of pipe disposed in said chamber so as to emit a heating medium.

3. In apparatus for mixing heterogeneous components including viscous material in batches to be agglomerated, the combination with a stationary mixing chamber, of a horizontally disposed shaft journalled therein and provided with blades adapted to mix the material, a movable bottom formed of a swinging trough-like member journaled on said shaft and adapted to swing about the same an arcuate distance sufficient to discharge the mixture substantially completely from said chamber.

4. In apparatus for mixing heterogeneous components including viscous material in batches to be agglomerated, the combination with a stationary mixing chamber, of a horizontally disposed shaft journalled therein and provided with blades adapted to mix the material, a movable bottom formed of a swinging trough-like member journaled on said shaft and adapted to swing about the same an arcuate distance sufficient to discharge the mixture substantially completely from said chamber, and means for locking said movable bottom in a predetermined position.

5. In apparatus for mixing heterogeneous components including viscous material in batches to be agglomerated, the combination with a stationary mixing chamber, of a horizontally disposed shaft journalled therein and provided with blades adapted to mix the material, a movable bottom formed of a swinging trough-like member journaled on said shaft and adapted to swing about the same an arcuate distance sufficient to discharge the mixture substantially completely from said chamber, and means for automatically locking said bottom in a predetermined lower position.

6. In apparatus for mixing heterogeneous components including viscous material in batches to be agglomerated, the combination with a mixing chamber, of a horizontally disposed shaft provided with blades adapted to mix the material, a movable bottom having end walls journaled on said shaft and adapted to swing about the same an arcuate distance sufficient to discharge the mixture substantially completely, one of said end walls having a locking groove formed therein, and a plunger adapted resiliently to engage with said groove.

In testimony whereof I affix my signature.

RICHARD BOWEN.